United States Patent
Liberman et al.

(12) 
(10) Patent No.: US 12,536,748 B1
(45) Date of Patent: Jan. 27, 2026

(54) METHODS FOR RENDERING OF CLIPPED 3D OBJECTS

(71) Applicant: Apple Inc., Cupertino, CA (US)

(72) Inventors: Alexander K. Liberman, San Jose, CA (US); Courtland M. Idstrom, Cupertino, CA (US); Thomas Post, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 18/471,074

(22) Filed: Sep. 20, 2023

Related U.S. Application Data

(60) Provisional application No. 63/376,888, filed on Sep. 23, 2022.

(51) Int. Cl.
  *G06T 17/20* (2006.01)
  *G06T 7/73* (2017.01)
  *G06T 15/30* (2011.01)

(52) U.S. Cl.
  CPC ............... *G06T 17/20* (2013.01); *G06T 7/75* (2017.01); *G06T 15/30* (2013.01); *G06T 2207/30201* (2013.01)

(58) Field of Classification Search
  None
  See application file for complete search history.

(56) References Cited

U.S. PATENT DOCUMENTS

| | | | |
|---|---|---|---|
| 9,378,584 B2 * | 6/2016 | Gravois | G06T 19/00 |
| 9,972,122 B1 * | 5/2018 | Yee | G06T 15/40 |

* cited by examiner

*Primary Examiner* — Nurun Flora
(74) *Attorney, Agent, or Firm* — Blank Rome LLP

(57) ABSTRACT

Techniques are disclosed for implementing systems for rendering clipped versions of 3D objects in a computationally efficient manner, e.g., for use in extended reality (XR) environments. The techniques are designed to render the camera-facing faces and the non-camera-facing faces of a 3D object's mesh differently and, optionally, according to a clipping plane that intersects the 3D object's mesh. According to some implementations, a solid color fill visual treatment may be used for the non-camera-facing faces of a 3D object's mesh, which creates a visual effect giving the appearance of a solid surface corresponding to the cross-section of the 3D object as it is clipped by the clipping plane. The techniques disclosed herein address an issue wherein portions of a clipped 3D object may seem to "disappear" in the XR environment, i.e., rather than rendering as a representation of a cross-sectional view of the 3D object parallel to the clipping plane.

19 Claims, 7 Drawing Sheets

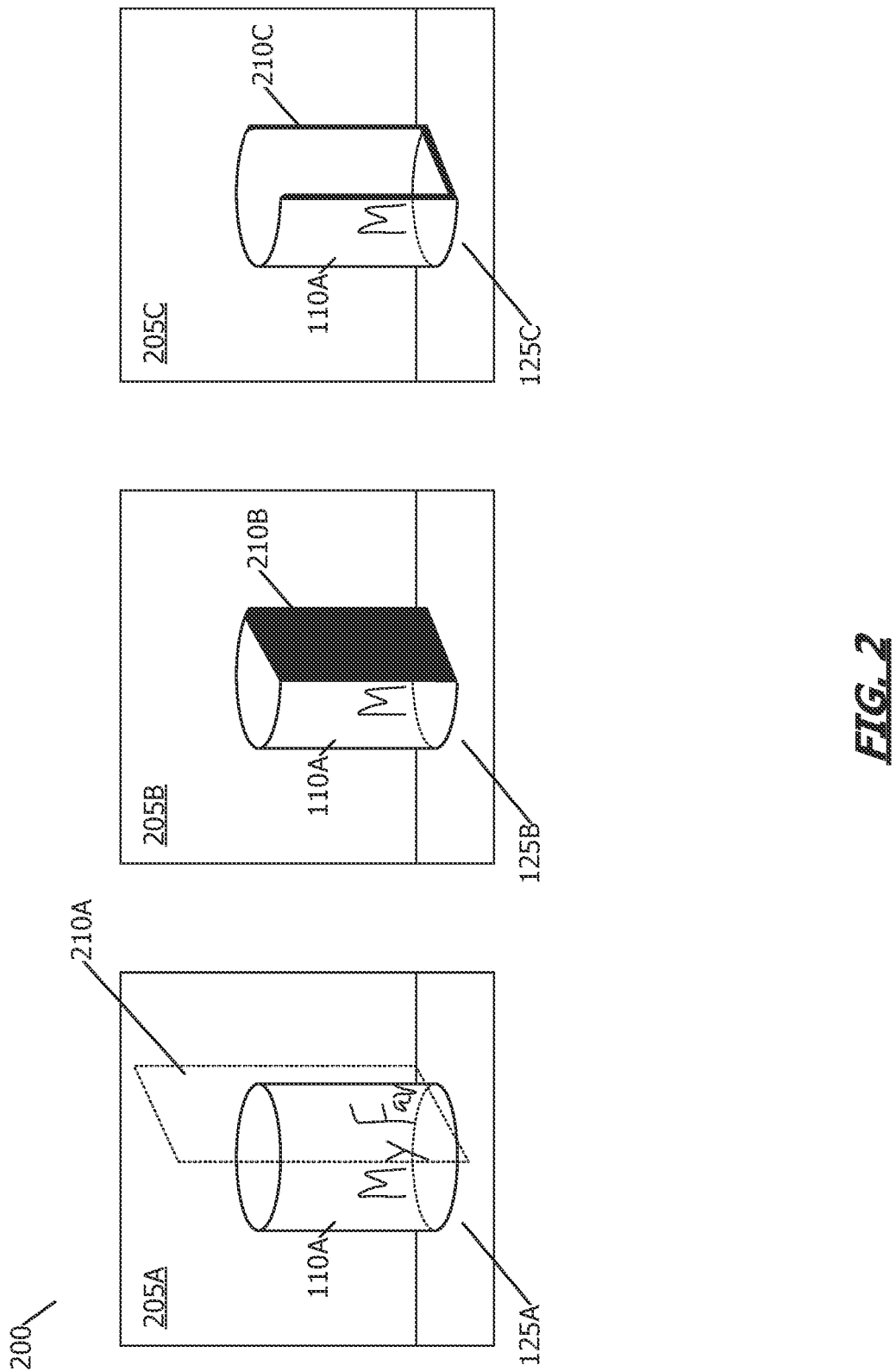

METHODS FOR RENDERING OF CLIPPED 3D OBJECTS

BACKGROUND

This disclosure relates generally to image processing. More particularly, but not by way of limitation, this disclosure relates to techniques and systems for rendering clipped versions of 3D objects in a computationally efficient manner.

Some electronic devices are capable of generating and presenting so-called "extended reality" (XR) environments on display screens, such as head mounted devices (HMD), or the like. An XR environment may include a wholly- or partially-simulated environment, including one or more virtual objects, which users of such electronic device can sense and/or interact with. In XR, a subset of a person's physical motions, or representations thereof, may be tracked, and, in response, one or more characteristics of the one or more virtual objects simulated in the XR environment may be adjusted in a manner that comports with at least one law of physics.

When graphical content is displayed in XR environments, novel and highly-efficient 3D object rendering techniques, such as those described herein, may be employed that utilize specially-configured rendering operations on the faces of a 3D object's mesh, e.g., based on whether or not such faces of the 3D object are facing towards a current camera viewpoint in the XR environment, in order to generate a realistic depiction of such 3D objects at desired image frame rates—and with respect for any defined clipping planes within the XR environment.

BRIEF DESCRIPTION OF THE DRAWINGS

FIG. 2 shows examples of a 3D object and the effects of applying a clipping plane when the camera-facing faces and the non-camera-facing faces of the 3D object's mesh are rendered differently, according to one or more embodiments.

DETAILED DESCRIPTION

Figure 1:
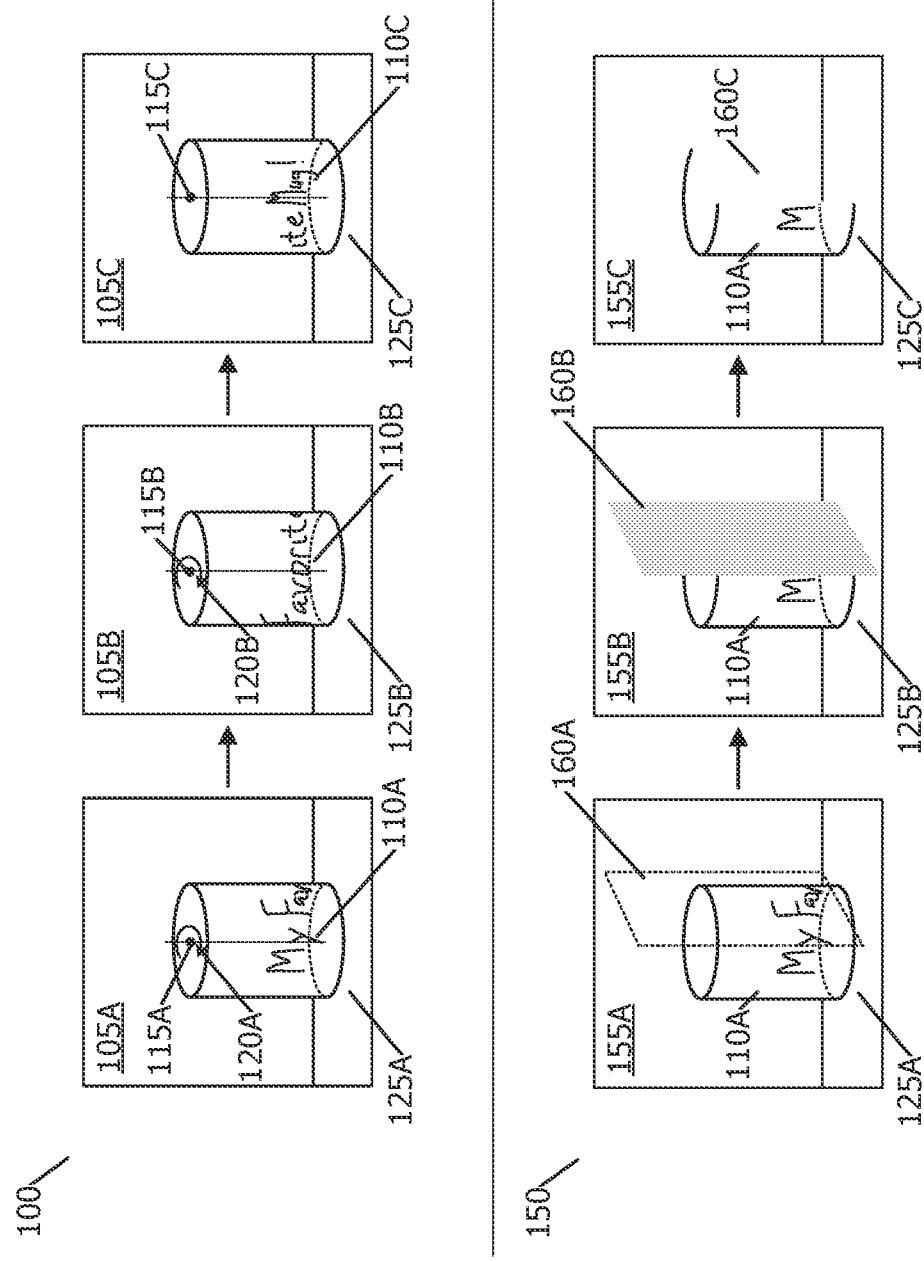
FIG. 1 shows examples of a 3D object and the effects of applying a clipping plane.

This disclosure pertains to systems, methods, and computer readable media for implementing novel techniques for rendering clipped versions of 3D objects in a computationally efficient manner, e.g., for use in extended reality (XR) environments. The techniques are designed to render the camera-facing faces and the non-camera-facing faces of a 3D object's mesh differently and, optionally, according to a clipping plane that intersects the 3D object's mesh, such as may occur when a 3D object being rendered as part of a first application in an XR environment exceeds a boundary of an allowed rendering region for the first application (e.g., perhaps crossing into an allowed rendering region for a different, second application also executing in the same XR environment).

According to some implementations described herein, a solid color fill visual treatment may be used for the non-camera-facing faces of a 3D object's mesh, which creates a lightweight (and efficient-to-render) visual effect giving the appearance of a solid surface corresponding to the cross-section of the 3D object as it is clipped by the clipping plane. The techniques disclosed herein address an issue wherein portions of a clipped 3D object may seem to "disappear" in the XR environment (thereby allowing a viewer to unnaturally see "through" the 3D object and into the portion of the scene in the XR environment behind the 3D object). By contrast, a non-real-time application, such as a computer-aided design (CAD) program, may solve this issue by building a solid mesh representing the cross-sectional surface parallel to the clipping plane that is affecting the 3D object.

As mentioned above, the techniques described herein may provide specific enhancements for rendering and presenting graphical information, including 3D objects, in XR environments. Some XR environments may be filled (or almost filled) with virtual objects or other simulated content (e.g., in the case of pure virtual reality (VR) environments). However, in other XR environments (e.g., in the case of augmented reality (AR) environments, and especially those wherein the user has a wide field of view (FOV), such as a horizontal FOV of 70 degrees or greater), there may be large portions of the user's FOV that have no virtual objects or other simulated content (such as simulated content from other applications that may be executing in the XR environment) in them at certain times. In other cases, the virtual objects (and/or other simulated content) in an XR environment may be occluded by certain foreground objects in the XR environment or clipped by so-called clipping planes within the XR environment (e.g., as may be used to define the allowable rendering volume within the XR environment for a given application). In still other XR environments, it may simply be desirable to perform different graphical processing operations on different parts of the 3D objects (e.g., rendering a first set of 3D object mesh faces that face away from a camera viewpoint with a predetermined visual treatment and rendering a second set of 3D object mesh faces that face toward the camera viewpoint with a second treatment, e.g., by mapping an appropriate texture, applying lighting or other visual effects, etc.).

Thus, what is needed are improved techniques for rendering graphical content in an XR environment that provide improved performance and efficiency for rendering 3D objects, and especially 3D object that are being at least partially clipped, such as by a clipping plane in the XR environment.

In one or more embodiments, a device for rendering clipped 3D objects in an efficient fashion, e.g., in an XR environment, is disclosed, comprising: a memory; a display screen; and one or more processors operatively coupled to the memory, wherein the one or more processors are configured to execute instructions causing the one or more processors to: obtain a 3D mesh representing a geometry of a virtual object, wherein the virtual object is associated with texture information; identify a first set of faces of the 3D mesh facing away from a camera viewpoint; render the first set of faces of the 3D mesh with a predetermined visual treatment; identify a second set of faces of the 3D mesh facing toward the camera viewpoint; render the second set of faces of the 3D mesh with the associated texture information; and apply a clipping plane to the 3D mesh, wherein applying the clipping plane reveals at least a portion of the first set of faces to the camera viewpoint. In some implementations, applying the clipping plane to the 3D mesh comprises graphically representing a planar intersection of the clipping plane and the 3D mesh.

In some such embodiments, the predetermined visual treatment comprises a solid color filling treatment. In other embodiments, the predetermined visual treatment may comprise shading the first set of faces of the 3D mesh as a cross-sectional surface that is parallel to the clipping plane. In still other embodiments, the predetermined visual treatment may comprise rendering any texture information that is associated with a camera-facing side of the first set of faces of the 3D mesh In other such embodiments, rendering the unclipped portion of the second set of faces of the 3D mesh with the associated texture information may further comprise rendering the texture information that is associated with a camera-facing side of the second set of faces of the 3D mesh.

In some embodiments, the instructions to render the first set of faces and the second set of faces of the 3D mesh are executed as part of a first application, wherein the clipping plane represents a boundary of an allowed rendering region for the first application (also sometimes referred to as an "application bounds"). In some such embodiments, the first application may be executing in an XR environment, and first set of faces and the second set of faces of the 3D mesh are being rendered to a display screen of the device executing the XR environment.

In one or more other embodiments, a non-transitory computer readable medium is disclosed. The non-transitory computer readable medium may comprise computer readable code that is executable by one or more processors to perform a method of rendering clipped 3D objects in an efficient fashion, wherein the computer readable code is executable by the one or more processors to: obtain a 3D mesh representing a geometry of a virtual object, wherein the virtual object is associated with texture information; identify a first set of faces of the 3D mesh facing away from a camera viewpoint; in accordance with a determination that the first set of faces of the 3D mesh face away from the camera, render the first set of faces of the 3D mesh with a solid color (wherein, e.g., the solid color from the first set of faces is visible where the one or more faces of the second set of faces are not rendered); identify a second set of faces of the 3D mesh facing toward the camera viewpoint; and in accordance with a determination that the second set of faces of the 3D mesh face towards the camera, render the second set of faces of the 3D mesh with the associated texture information.

In some such embodiments, in accordance with a determination that one or more faces of the second set of faces exceed an allowed region, the one or more processors may skip the one or more faces when rendering the second set of faces. In other such embodiments, in accordance with a determination that a subset of the second set of faces collides with a boundary (e.g., a boundary of another object or another application's allowable rendering volume), the one or more processors may skip the subset of the second set of faces when rendering the second set of faces. In other embodiments, the first set of faces of the 3D mesh may be rendered such that individual faces among the first set of faces are indistinguishable from each other.

In still other embodiments, the one or more processors may: process a pixel for rendering and then, in accordance with making a determination that the pixel is associated with a face of the second set of faces of the 3D mesh facing toward the camera and that the face of the second set of faces exceeds an allowed region, skipping the face of the second set of faces when rendering the second set of faces.

Exemplary Extended Reality (XR) Devices

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly- or partially-simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, wearable device, or the like) and adjust graphical content (e.g., foreground objects, background objects, and/or other objects of interest in a given implementation) and/or auditory content presented to the user—e.g., similarly to how such views and sounds would change in a physical environment. In some situations, the XR system can adjust characteristic(s) of graphical content in response to other inputs, such as a representation of the physical motion of an object or an occlusion of an object by another foreground object in a scene and/or clipping planes intersecting with graphical content in the scene, as will be explained in greater detail below.

Many different types of electronic systems can enable a user to interact with and/or sense an XR environment. A non-exclusive list of examples includes: heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment.

A head mountable system may also have a transparent or translucent display, rather than an opaque display. The transparent or translucent display can have a medium through which light is directed to a user's eyes. The display may utilize various display technologies, such as ULEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies, can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, a multiuser communication session can include an XR environment in which two or more devices are participating, while a single user session refers to an XR environment in which only one device is participating.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming—but would nevertheless be a routine undertaking for those of ordinary skill in the design and implementation of graphics rendering systems, having the benefit of this disclosure.

Exemplary Behavior 3D Objects and Clipping Planes

Referring now to FIG. 1, examples 100 of a 3D object (i.e., coffee mug 110) and examples 150 of the effects of applying a clipping plane to the 3D object 110 are illustrated. FIG. 1 shows a diagram of an example XR environment, according to one or more embodiments. While pertinent features are shown, those of ordinary skill in the art will appreciate, from the present disclosure, that various other features have not been illustrated for the sake of brevity— and so as not to obscure more pertinent aspects of the example among the implementations disclosed herein. To that end, as a nonlimiting example, the examples 100/150 includes a first physical environment, e.g., including table surface 125, whereas other operating environments could include a completely different physical environment.

As shown in FIG. 1, the XR environment depicted in the examples 100/150 includes different types of virtual and physical objects. As described above, the XR environment may be projected onto a display of one or more XR-enabled systems. In one or more embodiments, the display of the XR-enabled system may be a passthrough display (i.e., an opaque display, which reproduces some or all of the physical objects in the device's environment, e.g., by capturing them with outward-facing cameras), and a view of physical table 125 in the XR environment depicted in the examples 100/150 may simply be reproduced at the appropriate place on the display.

In other embodiments, "virtual" versions of physical table 125 may be rendered at the appropriate place on the display, e.g., allowing a user to adjust the appearance of such virtual objects by experimenting with what different materials, colors, sizes, etc. of the physical tables in the XR environment may look like.

In still other embodiments, the XR environment may further include different types of purely virtual objects, e.g., objects that are not actually physically present in the environment. In in the examples 100/150, and virtual coffee mug 110 represents an example of a purely virtual 3D object in the XR environment. As depicted, virtual coffee mug 110 is interacting with physical table 125 (i.e., it has been "placed on" physical table 125 in the displayed views of the XR environment 105/155).

In the case of virtual coffee mug 110, the visible portion of the exemplary texture that is mapped to the outer surface of the virtual coffee mug 110 (i.e., a texture that includes the words "My Favorite Mug!") may be defined in 3D space relative to the virtual coffee mug 110's origin point 115. In this way, in the event that virtual coffee mug 110 is moved around in the XR environment, placed into a different XR environment, used or updated by another user, etc., the appearance of the texture mapped to the surface of the virtual coffee mug 110 remains consistent.

An example of the three-dimensional nature of virtual coffee mug 110, three rotated views 105A/105B/105C are shown in FIG. 1. The first exemplary view of the virtual coffee mug. 105A, is a reproduction of the virtual coffee mug 110's hypothetical first position in the XR environment of example 100. That is, in view 105A, the letters "My Fav" (labeled 110A) on the outer surface of the virtual coffee mug 110 are currently visible.

As mentioned above, in some embodiments, the location and orientation of a given 3D object in 3D-space may be defined relative to its origin point, e.g., 115A. (In this example, origin point 115 for virtual coffee mug 110 is defined as being located in the center of the opening at the top of the mug, so it appears to be located consistently in each of the three exemplary rotated views of the virtual coffee mug 110, since it is being rotated around its central axis between the three exemplary rotated views 105A-105C (with arrow 120A indicating the rotation between view 105A and 105B and arrow 120B indicating the rotation between view 105B and 105C).

Turning now to the second exemplary view of the virtual coffee mug, 110B, the virtual coffee mug has been rotated around its central axis to the left by approximately 120 degrees. In view 105B, the letters "Favorit" (labeled 110B) on the outer surface of the virtual coffee mug 110 are currently visible. Finally, in the third exemplary view of the virtual coffee mug, 110C, the virtual coffee mug has been rotated around its central axis to the left by another approximately 120 degrees (i.e., relative to its position in view 105B). In view 105C, the final letters "ite Mug!" (labeled 110C) on the outer surface of the virtual coffee mug 110 are currently visible. (Note: the location and appearance of the physical table 125A/125B/125C stays constant across the three exemplary rotated views 105A-105C.)

Now that the 3D nature of virtual coffee mug 110 with the XR environment has been established, the description will turn to the example 150, which depicts possible results of the application of a clipping plane 160 to the virtual coffee mug 110. In the first view, 155A, a clipping plane 160A is shown in dashed outline form, to illustrate that at least a first portion of the camera-facing faces (e.g., triangular faces, quadrilateral faces, or the like) of the 3D mesh for virtual coffee mug 110A (i.e., the portion of the mug with the letters "y Fav") will be clipped by clipping plane 160A. As used herein, the determination of whether a given face of a 3D mesh is considered to be "camera-facing" or "non-camera-facing" may be done by computing a dot product between the face's surface normal and the camera's current viewpoint direction. For example, if it is assumed that the face's surface normal points aways from the surface, and the camera's viewpoint direction points "forward," i.e., away from the camera, then the surface may be adjudged to be "camera-facing" when the dot product between its surface normal vector and a vector representing the camera's current viewpoint direction is less than zero, and it may be adjudged to be "non-camera-facing" when the dot product between its surface normal vector and a vector representing the camera's current viewpoint direction is greater than zero.

Turning now to the second view, 155B, the clipping plane 160B is shown in an opaque, gray-shaded form, to illustrate that at least the first portion of the camera-facing faces of the 3D mesh for virtual coffee mug 110A (i.e., the portion of the mug with the letters "y Fav") will be clipped by clipping plane 160A, and, thus, without further specialized rendering treatment (e.g., as will be described in further detail below with reference to FIG. 2), no portion of the right-half of the front of the virtual coffee mug 110A may be visible to a viewer at the current camera viewpoint depicted in view 155B. Finally, turning to the third view, 155C, the clipping plane 160C is not shown, but, rather, the results of the clipping operation are depicted, i.e., no portion of the right-half of the front of the virtual coffee mug 110A is visible to a viewer at the current camera viewpoint depicted in view 155C, and that portion of the coffee mug is rendered as a "hole" or a "transparent" area, which allows a viewer to see an extension of the table 125C that the virtual coffee mug 110A is sitting on, as well as the wall behind the table 125C.

As will now be described in further detail below with reference to FIG. 2, a more preferable graphical treatment for the virtual coffee mug 110A may be to render the non-camera-facing faces of the virtual coffee mug 110A in such a way that it gives the virtual coffee mug 110A the appearance of having a solid, cross-sectional surface that is parallel to the clipping plane 160 once the clipped portion of the virtual coffee mug 110A has been removed from the rendering operation—but doing so in a lightweight and efficient fashion, without needing to actually render a full, real-time solid 3D object mesh model for the virtual coffee mug 110.

Exemplary Behavior of 3D Objects and Clipping Planes with Improved Rendering Techniques Referring now to FIG. 2, an example 200 of a 3D object and the effects of applying a clipping plane when the camera-facing faces and the non-camera-facing faces of the 3D object's mesh are rendered differently is shown, according to one or more embodiments. Example 200 utilizes the same exemplary 3D virtual coffee mug object 110, as in views 105/155 of the XR environment depicted in FIG. 1.

As in view 155A, exemplary view 205A shows a clipping plane 210A in dashed outline form, to illustrate that at least a first portion of the camera-facing faces of the 3D mesh for virtual coffee mug 110A (i.e., again, the portion of the mug with the letters "y Fav") will be clipped by clipping plane 210A. Turning now to the second view, 205B, the result of the application of the clipping plane 210A is shown as an opaque, solid color-filled surface 210B (in this case, a black-color fill), to illustrate that at least the first portion of the camera-facing faces of the 3D mesh for virtual coffee mug 110A (i.e., the portion of the mug with the letters "y Fav") will be clipped by clipping plane 210A. In this exemplary view 205B, the non-clipped portion of the virtual coffee mug 110A is rendered as having a solid, cross-sectional surface that is parallel to the clipping plane 210A. Rendering the individual faces in this manner makes them indistinguishable from each other in the final presentation to a viewer (i.e., the viewer just sees a solid-colored surface and no 3D object geometry). This type of effect illustrated in exemplary view 205B may be seen, e.g., if the virtual coffee mug 110A is modeled as a solid cylindrical surface mesh, i.e., with no "inner" surfaces wherein a virtual liquid could be poured. However, rather than becoming completely transparent/invisible behind the clipping plane (as in the example depicted in view 155C of FIG. 1), the virtual coffee mug 110A as rendered in view 205B, i.e., revealing a portion of the non-camera-facing faces of the 3D mesh, gives a viewer of the XR environment a more realistic and "natural" sense of where the virtual coffee mug 110A is in the XR environment, how much of it has been clipped (e.g., by being pushed through the clipping plane 210A), and how far it would need to be moved (and it what direction) in order to show up and again be fully rendered in the viewer's current viewpoint of the XR environment.

Finally, turning to the third view, 205C, the clipping plane 210A is not shown, but, rather, the results of an improved clipping operation are depicted, i.e., again, the virtual coffee mug 110A is rendered as having a solid, cross-sectional surface that is parallel to the clipping plane 210A. In the example of view 205C, the virtual coffee mug 110A is modeled as a true cylindrical mug-shaped mesh, i.e., with an "outer" surface (e.g., wherein the words "My Favorite Mug!" are written), as well as "inner" surfaces, e.g., wherein a virtual liquid could be poured. As may now be appreciated, by first rendering the set of non-camera-facing faces of the virtual coffee mug 110A with a predetermined visual treatment (in this case, again, a solid black fill), and then rendering the camera-facing faces of the virtual coffee mug 110A with their associated textures, a more realistic and natural rendering of the virtual coffee mug 110A is presented in the XR environment after the clipping plane is applied, thereby revealing a portion of the non-camera-facing faces of the 3D mesh. Again, rather than becoming completely transparent/invisible behind the clipping plane (as in the example depicted in view 155C of FIG. 1), the virtual coffee mug 110A as rendered in view 205C gives a viewer of the XR environment a better sense of where the virtual coffee mug 110A is in the XR environment, how much of it has been clipped (e.g., by being pushed through the clipping plane 210A), and how far it would need to be moved (and it what direction) in order to show up and again be fully rendered in the viewer's current viewpoint of the XR environment.

Improved Rendering Operations for Clipped 3D Objects in XR Environments

Figure 3A:
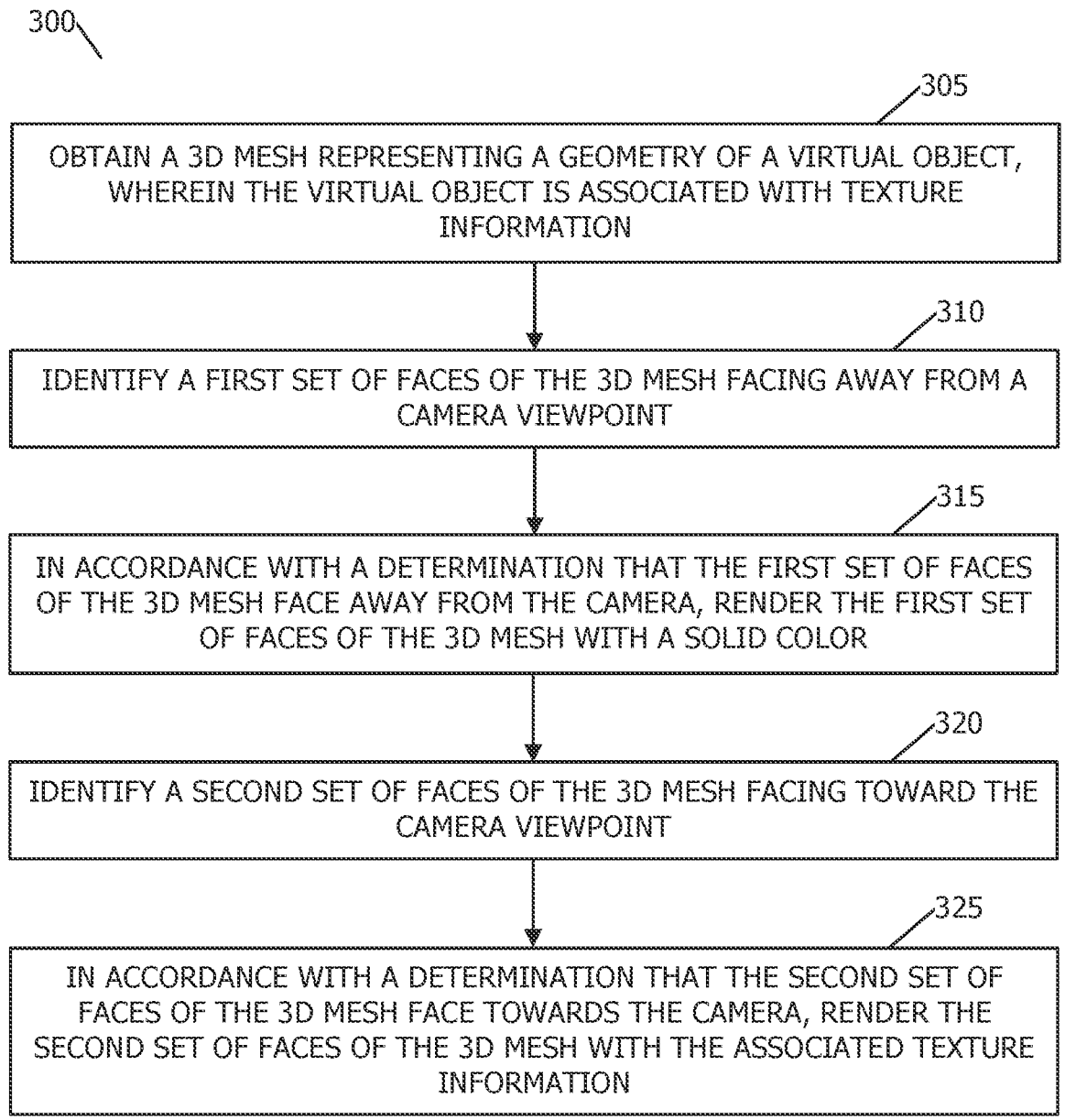
FIG. 3A shows a flowchart of a method for rendering the camera-facing faces and the non-camera-facing faces of a 3D object's geometry differently, according to one or more embodiments.

Referring now to FIG. 3A, a flowchart of a method 300 for rendering the camera-facing faces and the non-camera-facing faces of a 3D object's geometry differently is shown, according to one or more embodiments. First, at step 305, the method 300 may obtain a 3D mesh representing a geometry of a virtual object, wherein the virtual object is associated with texture information. Next, at step 310, the method 300 may identify a first set of faces of the 3D mesh facing away from a camera viewpoint. At Step 315, and in accordance with a determination that the first set of faces of the 3D mesh face away from the camera, the method 300 may render the (camera-facing sides of the) first set of faces of the 3D mesh with a solid color, or other visual treatment operation, as desired.

Next, at step 320, the method 300 may identify a second set of faces of the 3D mesh facing toward the camera viewpoint. At Step 325, and in accordance with a determination that the second set of faces of the 3D mesh face towards the camera, the method 300 may render the second set of faces of the 3D mesh with the associated texture information (e.g., according to normal rendering operations for camera-facing faces of the 3D object's geometry).

Figure 3B:
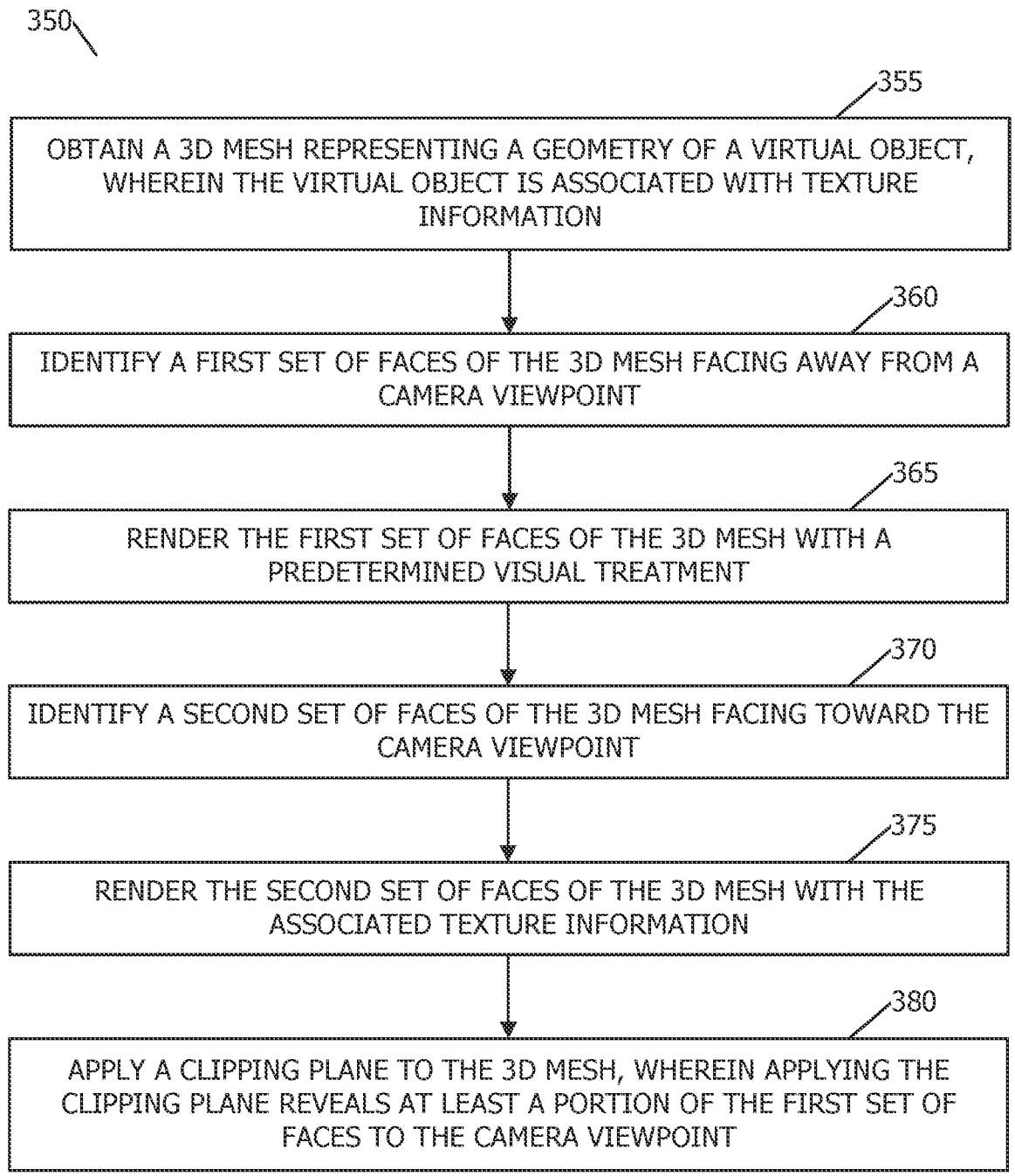
FIG. 3B shows a flowchart of a method for rendering the camera-facing faces and the non-camera-facing faces of a 3D object's geometry differently and according to a clipping plane intersecting the 3D object's mesh, according to one or more embodiments.

Referring now to FIG. 3B, a flowchart of a method 350 for rendering the camera-facing faces and the non-camera-facing faces of a 3D object's geometry differently and according to a clipping plane intersecting the 3D object's mesh is shown, according to one or more embodiments. First, at step 355, the method 350 may obtain a 3D mesh representing a geometry of a virtual object, wherein the virtual object is associated with texture information. Next, at step 360, the method 350 may identify a first set of faces of the 3D mesh facing away from a camera viewpoint. Next, at step 365, the method 350 may render (the camera-facing sides of) those first set of faces of the 3D mesh with a predetermined visual treatment (e.g., a solid color fill treatment, or other form of desired visual treatment operation to create the visual effect of a cross-sectional plane of the 3D object, i.e., without needing to actually render a full, solid 3D object in real-time in the XR environment).

Next, at step 370, the method 350 may identify a second set of faces of the 3D mesh facing toward the camera viewpoint. Next, at step 375, the method 350 may render the second set of faces of the 3D mesh with the associated texture information (e.g., according to normal rendering operations for camera-facing faces of the 3D object's geometry). Finally, at step 380, the method 350 may apply a clipping plane to the 3D mesh, wherein applying the clipping plane reveals at least a portion of the first set of faces to the camera viewpoint. (It is to be understood that, in some cases, at least a portion of the first set of faces may be clipped by the clipping plane as well.)

As may now be appreciated, the techniques described herein provide their improved efficiency and more realistic rendering results without modifying the actual mesh or surface geometry of the 3D objects involved. Moreover, the techniques described herein do not necessitate the performance costly (and/or resource-intensive) mode switches on graphics hardware, such as the activation and use of a stencil buffer, or the like. According to some implementations, 3D objects may be clipped to an arbitrary set of oriented bounding boxes (OBBs), i.e., bounding parallelepipeds whose faces and edges are not necessarily parallel to the basis vectors of the environment in which they're defined. Each OBB may consist of 6 clip planes (e.g., one clipping plane for each of the top, bottom, left, right, front, and back sides). Due to various graphics hardware architecture limitations, a stencil buffer may only have a limited number of bits (e.g., 8 bits) available, thereby limiting the number of distinct clipping planes that can be tracked using a stencil buffer-based approach. According to still other implementations, performing ray tracing from the surface against an OBB, i.e., rather than using a single clipping plane, may be performed as a possible system optimization.

Exemplary Block Diagram

Figure 4:
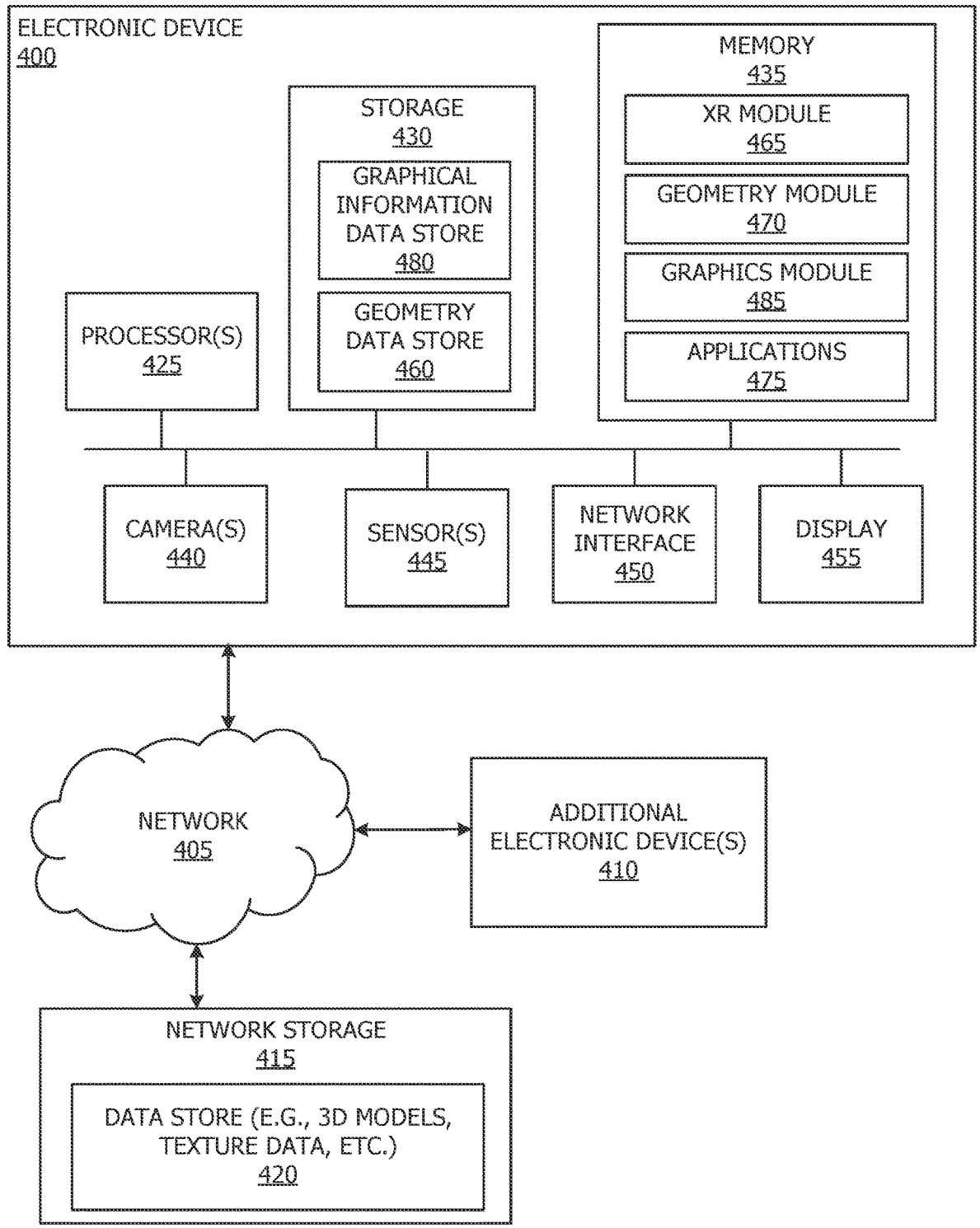
FIG. 4 shows, in block diagram form, a simplified system diagram according to one or more embodiments.

Referring now to FIG. 4, a simplified block diagram of an electronic device 400 is depicted, communicably connected to additional electronic devices 410 and a network storage 415 over a network 405, in accordance with one or more embodiments of the disclosure. Electronic device 400 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 400, additional electronic device 410, and/or network storage 415 may additionally, or alternatively, include one or more additional devices within which the various functionality may be contained, or across which the various functionality may be distributed, such as server devices, base stations, accessory devices, and the like. Illustrative networks, such as network 405 include, but are not limited to, a local network such as a universal serial bus (USB) network, an organization's local area network, and a wide area network such as the Internet. According to one or more embodiments, electronic device 400 may be utilized to participate in a single user or multiuser communication session in an XR environment. It should be understood that the various components and functionality within electronic device 400, additional electronic device 410 and network storage 415 may be differently distributed across the devices, or they may be distributed across additional devices.

Electronic Device 400 may include one or more processors 425, such as a central processing unit (CPU). Processor(s) 425 may include a system-on-chip such as those found in mobile devices and include one or more dedicated graphics processing units (GPUs). Further, processor(s) 425 may include multiple processors of the same or different type. Electronic device 400 may also include a memory 435. Memory 435 may include one or more different types of memory, which may be used for performing device functions in conjunction with processor(s) 425. For example, memory 435 may include cache, ROM, RAM, or any kind of transitory or non-transitory computer readable storage medium capable of storing computer readable code. Memory 435 may store various programming modules for execution by processor(s) 425, including XR module 465, geometry module 470, graphics module 485, and other various applications 475. Electronic device 400 may also include storage 430. Storage 430 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Electronic device may additionally include a network interface 450, from which the electronic device 400 can communicate across network 405.

Electronic device 400 may also include one or more cameras 440 or other sensors 445, such as depth sensor(s), from which depth or other characteristics of an environment may be determined. In one or more embodiments, each of the one or more cameras 440 may be a traditional RGB camera, or a depth camera. Further, cameras 440 may include a stereo- or other multi-camera system, a time-of-flight camera system, or the like. Electronic device 400 may also include a display 455. The display device 455 may utilize digital light projection, OLEDs, LEDS, ULEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 430 may be utilized to store various data and structures which may be utilized for providing state information in order to manage geometry data for physical environments of a local user and/or a remote user. Storage 430 may include, for example, geometry data store 460. Geometry data store 460 may be utilized to store data related to one or more physical environments in which electronic device 400 participates, e.g., in a single user session or a multiuser communication session. For example, geometry data store 460 may store characteristics of a physical environment, which may affect available space for presentation of components (e.g., UI elements or other 3D graphical components to be displayed in an XR environment) during a single user sessions or multiuser communication sessions. As another example, geometry data store 460 may store characteristics of a physical environment, which may affect how a user is able to move around or interact with the physical environment around the device. Storage 430 may further include, for example, graphical information data store 480. Graphical information data store 480 may store characteristics of graphical information (e.g., 3D model information, texture information and/or color information) that may be composited and rendered in an image frame containing a representation of all or part of the user's physical environment. Additionally, or alternatively, geometry data and graphical information data may be stored across network 405, such as by data store 420.

According to one or more embodiments, memory 435 may include one or more modules that comprise computer readable code executable by the processor(s) 425 to perform functions. The memory may include, for example, an XR module 465, which may be used to process information in an XR environment. The XR environment may be a computing environment which supports a single user experience by electronic device 400, as well as a shared, multiuser experience, e.g., involving collaboration with an additional electronic device(s) 410.

The memory 435 may also include a geometry module 470, for processing information regarding the characteristics of a physical environment, which may affect how a user moves around the environment or interacts with physical and/or virtual objects within the environment. The geometry module 470 may determine geometric characteristics of a physical environment, for example from sensor data collected by sensor(s) 445, or from pre-stored information, such as from geometry data store 460. Applications 475 may include, for example, computer applications that may be experienced in an XR environment by one or multiple devices, such as electronic device 400 and additional electronic device(s) 410. The graphics module 485 may be used, e.g., for processing information regarding characteristics of graphical information, including depth and/or color information, which may or may not be composited into an image frame depicting all or part of a user's physical environment)

Although electronic device 400 is depicted as comprising the numerous components described above, in one or more embodiments, the various components may be distributed across multiple devices. Accordingly, although certain processes are described herein, with respect to the particular systems as depicted, in one or more embodiments, the various processes may be performed differently, based on the differently-distributed functionality. Further, additional components may be used, some combination of the functionality of any of the components may be combined.

Exemplary Electronic Devices

Figure 5A:
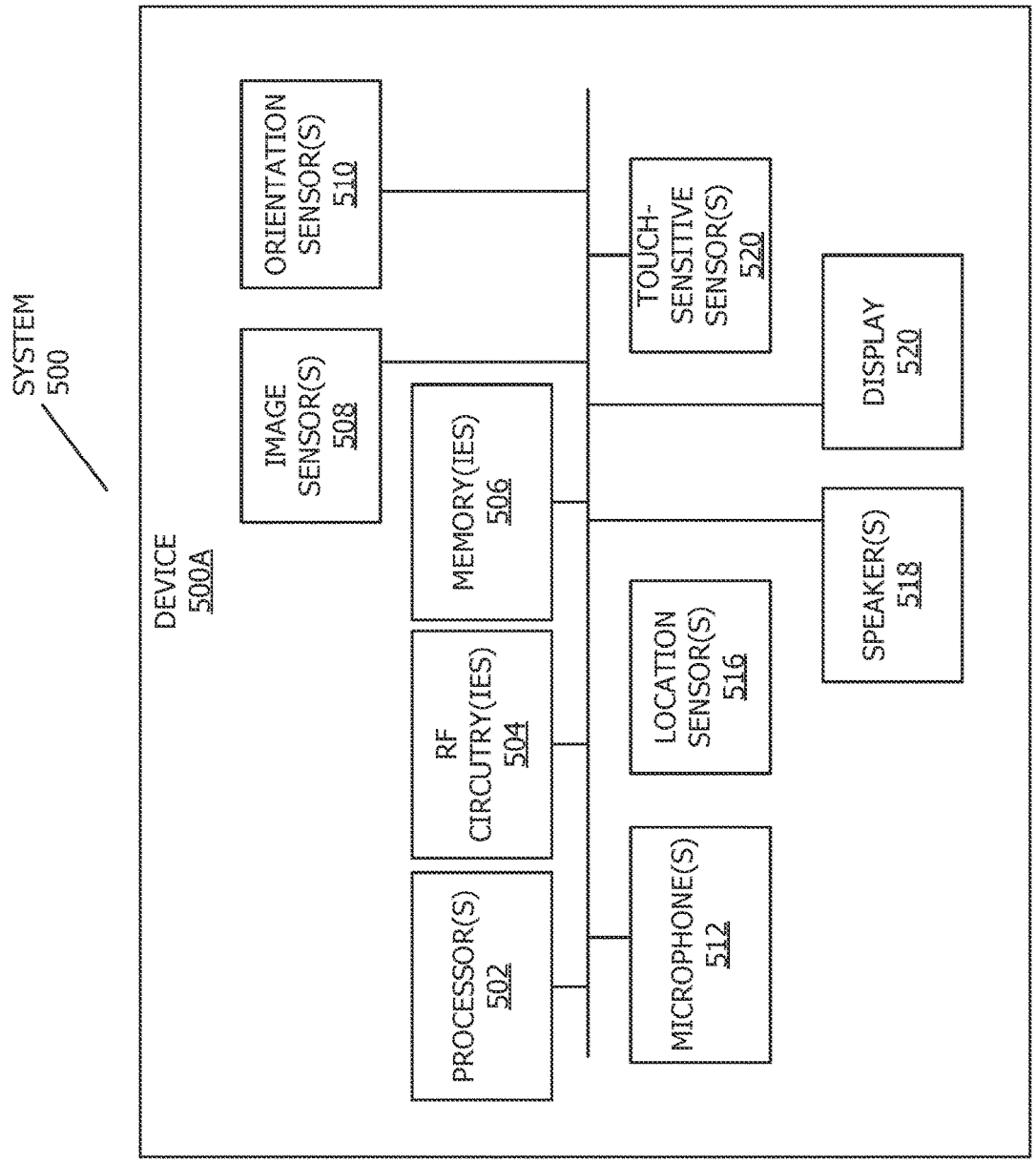
FIGS. 5A-5B show exemplary systems for use in various computer-simulated XR technologies.
Figure 5B:
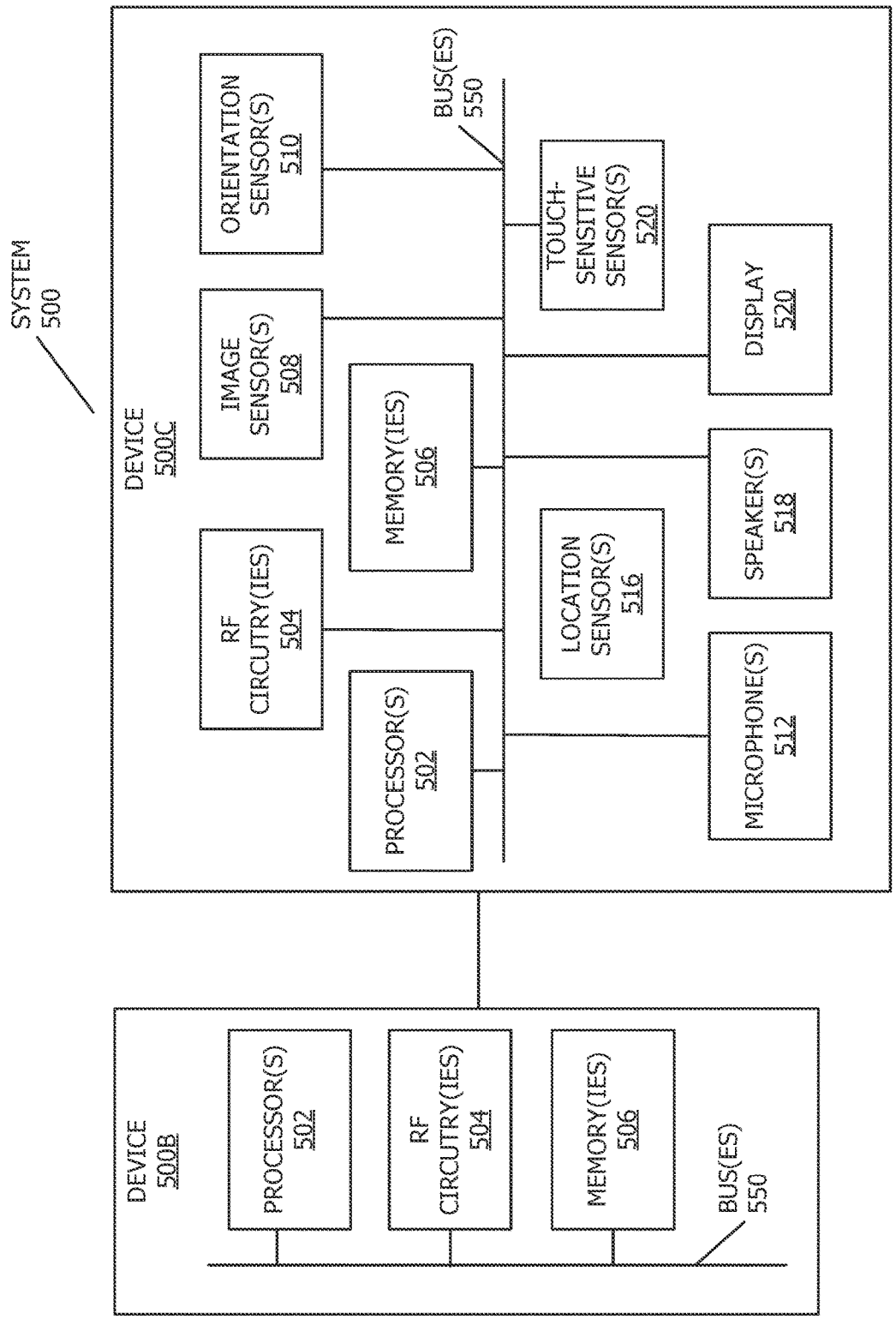

FIG. 5A and FIG. 5B depict exemplary system 500 for use in various extended reality (XR) technologies. In some examples, as illustrated in FIG. 5A, system 500 includes device 500A. Device 500A includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500a.

In some examples, elements of system 500 are implemented in a base station device (e.g., a computing device, such as a remote server, mobile device, or laptop) and other elements of system 500 are implemented in a second device (e.g., a head-mounted device, or "HMD"). In some examples, device 500A is implemented in a base station device or a second device.

As illustrated in FIG. 5B, in some examples, system 500 includes two (or more) devices in communication, such as through a wired connection or a wireless connection. First device 500B (e.g., a base station device) includes processor(s) 502, RF circuitry(ies) 504, and memory(ies) 506. These components optionally communicate over communication bus(es) 550 of device 500C. Second device 500C (e.g., a head-mounted device, or "HMD") includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500C.

System 500 includes processor(s) 502 and memory(ies) 506. Processor(s) 502 include one or more general processors, one or more graphics processors, and/or one or more digital signal processors. In some examples, memory (ies) 506 are one or more non-transitory computer-readable storage mediums (e.g., flash memory, random access memory) that store computer-readable instructions configured to be executed by processor(s) 502 to perform the techniques described below.

System 500 includes RF circuitry(ies) 504. RF circuitry(ies) 504 optionally include circuitry for communicating with electronic devices, networks, such as the Internet, intranets, and/or a wireless network, such as cellular networks and wireless local area networks (LANs). RF circuitry (ies) 504 optionally includes circuitry for communicating using near-field communication and/or short-range communication, such as Bluetooth®.

System 500 includes display(s) 520. Display(s) 520 may have an opaque display. Display(s) 520 may have a transparent or semi-transparent display that may incorporate a substrate through which light representative of images is directed to an individual's eyes. Display(s) 520 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 520 include heads up displays, automotive windshields with the ability to display graphics, windows with the ability to display graphics, lenses with the ability to display graphics, tablets, smartphones, and desktop or laptop computers. Alternatively, system 500 may be designed to receive an external display (e.g., a smartphone). In some examples, system 500 is a projection-based system that uses retinal projection to project images onto an individual's retina or projects virtual objects into a physical setting (e.g., onto a physical surface or as a holograph).

In some examples, system 500 includes touch-sensitive sensor(s) 522 for receiving user inputs, such as tap inputs and swipe inputs. In some examples, display(s) 520 and touch-sensitive sensor(s) 522 form touch-sensitive display(s).

System 500 includes image sensor(s) 508. Image sensors(s) 508 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 508 also optionally include one or more event camera(s) configured to capture movement of physical elements in the physical setting. Image sensor(s) 508 also optionally include one or more depth sensor(s) configured to detect the distance of physical elements from system 500. In some examples, system 500 uses CCD sensors, event cameras, and depth sensors in combination to detect the physical setting around system 500. In some examples, image sensor(s) 508 include a first image sensor and a second image sensor. The first image sensor and the second image sensor are optionally configured to capture images of physical elements in the physical setting from two distinct perspectives. In some examples, system 500 uses image sensor(s) 508 to receive user inputs, such as hand gestures. In some examples, system 500 uses image sensor(s) 508 to detect the position and orientation of system 500 and/or display(s) 520 in the physical setting. For example, system 500 uses image sensor(s) 508 to track the position and orientation of display(s) 520 relative to one or more fixed elements in the physical setting.

In some examples, system 500 includes microphones(s) 512. System 500 uses microphone(s) 512 to detect sound from the user and/or the physical setting of the user. In some examples, microphone(s) 512 includes an array of microphones (including a plurality of microphones) that optionally operate in tandem, such as to identify ambient noise or to locate the source of sound in space of the physical setting.

System 500 includes orientation sensor(s) 510 for detecting orientation and/or movement of system 500 and/or display(s) 520. For example, system 500 uses orientation sensor(s) 510 to track changes in the position and/or orientation of system 500 and/or display(s) 520, such as with respect to physical elements in the physical setting. Orientation sensor(s) 510 optionally include one or more gyroscopes and/or one or more accelerometers.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3A-3B, or the arrangement of elements shown in FIGS. 4 and 5A-5B, should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   obtain a 3D mesh representing a geometry of a virtual object, wherein the virtual object is associated with texture information;
   identify a first set of faces of the 3D mesh facing away from a camera viewpoint;
   in accordance with a determination that the first set of faces of the 3D mesh face away from the camera, render the first set of faces of the 3D mesh with a solid color;
   identify a second set of faces of the 3D mesh facing toward the camera viewpoint;
   in accordance with a determination that the second set of faces of the 3D mesh face towards the camera, render the second set of faces of the 3D mesh with the associated texture information; and
   in accordance with a determination that one or more faces of the second set of faces exceed an allowed region, skip the one or more faces when rendering the second set of faces.

2. The non-transitory computer readable medium of claim 1, wherein, in accordance with a determination that a subset of the second set of faces collides with a boundary, skip the subset of the second set of faces when rendering the second set of faces.

3. The non-transitory computer readable medium of claim 1, wherein the solid color from the first set of faces is visible where the one or more faces of the second set of faces are not rendered.

4. The non-transitory computer readable medium of claim 1, wherein the first set of faces of the 3D mesh are rendered such that individual faces among the first set of faces are indistinguishable from each other.

5. The non-transitory computer readable medium of claim 1, further comprising computer readable code to:
   process a pixel for rendering;
   determine that the pixel is associated with a face of the second set of faces of the 3D mesh facing toward the camera and that the face of the second set of faces exceeds an allowed region; and
   in accordance with the determination that the pixel is associated with a face of the second set of faces of the 3D mesh facing toward the camera and that the face of the second set of faces exceeds an allowed region, skip the face of the second set of faces when rendering the second set of faces.

6. A method of rendering computer graphics, comprising:

obtaining a 3D mesh representing a geometry of a virtual object, wherein the virtual object is associated with texture information;

identifying a first set of faces of the 3D mesh facing away from a camera viewpoint;

rendering the first set of faces of the 3D mesh with a predetermined visual treatment;

identifying a second set of faces of the 3D mesh facing toward the camera viewpoint;

rendering the second set of faces of the 3D mesh with the associated texture information, wherein, in accordance with a determination that a subset of the second set of faces of the 3D mesh collides with a clipping plane, skipping the subset of the second set of faces of the 3D mesh when rendering the second set of faces; and applying the clipping plane to the 3D mesh, wherein applying the clipping plane reveals at least a portion of the first set of faces to the camera viewpoint.

7. The method of claim 6, wherein applying the clipping plane to the 3D mesh comprises graphically representing a planar intersection of the clipping plane and the 3D mesh.

8. The method of claim 6, wherein the predetermined visual treatment comprises a solid color filling treatment.

9. The method of claim 6, wherein the predetermined visual treatment comprises shading the first set of faces of the 3D mesh as a cross-sectional surface that is parallel to the clipping plane.

10. The method of claim 6, wherein rendering the first set of faces of the 3D mesh with a predetermined visual treatment further comprises rendering the texture information that is associated with a camera-facing side of the first set of faces of the 3D mesh.

11. The method of claim 6, wherein rendering the second set of faces of the 3D mesh with the associated texture information further comprises rendering the texture information that is associated with a camera-facing side of the second set of faces of the 3D mesh.

12. The method of claim 6, wherein the first set of faces and the second set of faces of the 3D mesh are being rendered as part of a first application, and wherein the clipping plane represents a boundary of an allowed rendering region for the first application.

13. A device, comprising:

a memory;

a display screen; and one or more processors operatively coupled to the memory, wherein the one or more processors are configured to execute instructions causing the one or more processors to:

obtain a 3D mesh representing a geometry of a virtual object, wherein the virtual object is associated with texture information;

identify a first set of faces of the 3D mesh facing away from a camera viewpoint;

render the first set of faces of the 3D mesh with a predetermined visual treatment;

identify a second set of faces of the 3D mesh facing toward the camera viewpoint;

render the second set of faces of the 3D mesh with the associated texture information, wherein, in accordance with a determination that a subset of the second set of faces of the 3D mesh collides with a clipping plane, skipping the subset of the second set of faces of the 3D mesh when rendering the second set of faces; and apply the clipping plane to the 3D mesh, wherein applying the clipping plane reveals at least a portion of the first set of faces to the camera viewpoint.

14. The device of claim 13, wherein the predetermined visual treatment comprises a solid color filling treatment.

15. The device of claim 13, wherein the predetermined visual treatment comprises shading the first set of faces of the 3D mesh as a cross-sectional surface that is parallel to the clipping plane.

16. The device of claim 13, wherein the instructions to render the first set of faces of the 3D mesh with a predetermined visual treatment further comprise instructions to render the texture information that is associated with a camera-facing side of the first set of faces of the 3D mesh.

17. The device of claim 13, wherein the instructions to render the second set of faces of the 3D mesh with the associated texture information further comprise instructions to render the texture information that is associated with a camera-facing side of the second set of faces of the 3D mesh.

18. The device of claim 13, wherein the instructions to render the first set of faces of the 3D mesh and the instructions to render the second set of faces of the 3D mesh are executed as part of a first application, and wherein the clipping plane represents a boundary of an allowed rendering region for the first application.

19. The device of claim 18, wherein the first application is executing in an extended reality (XR) environment, and wherein the first set of faces of the 3D mesh and the second set of faces of the 3D mesh are being rendered to the display screen.

* * * * *